(12) United States Patent
Wu et al.

(10) Patent No.: US 8,159,942 B2
(45) Date of Patent: Apr. 17, 2012

(54) METHOD OF SELECTING A PROFILE OF A BROADBAND COMMUNICATION LINE

(75) Inventors: Xidong Wu, Livermore, CA (US); Ganesh Krishnamuthi, Danville, CA (US); Kapil Shrikhande, Berkley, CA (US); Raghvendra G. Savoor, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1140 days.

(21) Appl. No.: 11/096,206

(22) Filed: Mar. 31, 2005

(65) Prior Publication Data
US 2006/0221849 A1    Oct. 5, 2006

(51) Int. Cl.
G01R 31/08    (2006.01)
H04J 3/16     (2006.01)
G06F 15/173   (2006.01)

(52) U.S. Cl. ............. 370/230.1; 370/235; 370/468; 709/224

(58) Field of Classification Search ......... 370/229–236, 370/251–252, 465, 468, 477, 493–495; 709/220–225
See application file for complete search history.

(56) References Cited

U.S. PATENT DOCUMENTS

| | | | |
|---|---|---|---|
| RE36,862 E | 9/2000 | Gupta et al. | |
| 6,130,882 A | 10/2000 | Levin | |
| 6,175,832 B1 | 1/2001 | Luzzi et al. | |
| 6,178,448 B1 * | 1/2001 | Gray et al. | 709/224 |
| 6,219,378 B1 | 4/2001 | Wu | |
| 6,263,048 B1 | 7/2001 | Nelson et al. | |
| 6,445,773 B1 | 9/2002 | Liang et al. | |
| 6,498,808 B1 | 12/2002 | Tzannes | |
| 6,636,505 B1 | 10/2003 | Wang et al. | |
| 6,647,058 B1 | 11/2003 | Bremer et al. | |
| 6,678,245 B1 | 1/2004 | Cooper et al. | |
| 6,782,078 B1 | 8/2004 | Posthuma | |
| 6,798,769 B1 | 9/2004 | Farmwald | |
| 6,816,469 B1 | 11/2004 | Kung et al. | |
| 6,865,232 B1 | 3/2005 | Isaksson et al. | |
| 6,904,054 B1 * | 6/2005 | Baum et al. | 370/467 |
| 6,963,541 B1 * | 11/2005 | Vogel et al. | 370/252 |
| 6,965,597 B1 * | 11/2005 | Conway | 370/389 |
| 6,985,444 B1 | 1/2006 | Rosen | |
| 7,050,924 B2 * | 5/2006 | Rix et al. | 702/124 |
| 7,218,645 B2 | 5/2007 | Lotter et al. | |
| 7,295,570 B1 | 11/2007 | Arnold et al. | |
| 2002/0021708 A1 | 2/2002 | Ishiai | |
| 2002/0080886 A1 | 6/2002 | Ptasinski et al. | |
| 2002/0098799 A1 * | 7/2002 | Struhsaker et al. | 455/3.05 |
| 2002/0167936 A1 * | 11/2002 | Goodman | 370/352 |

(Continued)

OTHER PUBLICATIONS

International Search Report and Written Opinion for International Application No. PCT/US06/04386, mailed Aug. 8, 2007.

(Continued)

*Primary Examiner* — Aung S Moe
*Assistant Examiner* — Redentor Pasia
(74) *Attorney, Agent, or Firm* — Toler Law Group, PC (57) ABSTRACT

The application discloses a system and a method of selecting a profile of a digital subscriber line. In a particular embodiment, the method includes setting a threshold for voice quality and determining a number of acceptable code violations that can occur without compromising the voice quality of the digital subscriber line. When the actual number of code violations exceeds the determined number of code violations an alternate profile is selected for the DSL line.

15 Claims, 4 Drawing Sheets

U.S. PATENT DOCUMENTS

| | | |
|---|---|---|
| 2002/0168054 A1 | 11/2002 | Klos et al. |
| 2003/0007455 A1 | 1/2003 | Kohzuki et al. |
| 2003/0012138 A1* | 1/2003 | Abdelilah et al. ............ 370/231 |
| 2003/0012180 A1* | 1/2003 | Donahue et al. .............. 370/352 |
| 2003/0033262 A1 | 2/2003 | Aoki |
| 2003/0095591 A1 | 5/2003 | Rekai et al. |
| 2003/0189977 A1 | 10/2003 | Sweitzer et al. |
| 2003/0218984 A1 | 11/2003 | Tanaka |
| 2004/0136329 A1 | 7/2004 | Duvaut et al. |
| 2004/0160979 A1* | 8/2004 | Pepin et al. ................... 370/462 |
| 2004/0193974 A1 | 9/2004 | Quan et al. |
| 2005/0068891 A1 | 3/2005 | Arsikere et al. |
| 2005/0130645 A1* | 6/2005 | Albert Dobson et al. ..... 455/423 |
| 2005/0138524 A1* | 6/2005 | Cioffi ........................... 714/758 |
| 2005/0172030 A1 | 8/2005 | Fay |
| 2005/0195797 A1* | 9/2005 | Kryuchkov et al. .......... 370/352 |
| 2005/0261895 A1* | 11/2005 | Bauer et al. ................... 704/216 |
| 2006/0153174 A1* | 7/2006 | Towns-von Stauber et al. ............................. 370/356 |
| 2007/0254644 A1* | 11/2007 | Dobson et al. ................ 455/423 |

OTHER PUBLICATIONS

International Search Report for International Patent No. PCT/US04/39622, mailed Oct. 31, 2006.

HTTP://WWW.TMCNET.COM/IT/0501/0501LABS1.HTM; Internet Telephony TMC Labs; Technology Marketing Corporation (TMC); May 2001(6 pages).

* cited by examiner

METHOD OF SELECTING A PROFILE OF A BROADBAND COMMUNICATION LINE

FIELD OF THE DISCLOSURE

The present disclosure is related to a control system and method of selecting profiles for broadband communication lines.

BACKGROUND OF THE DISCLOSURE

The traditional process for making performance adjustments to broadband communication lines, such as digital subscriber loop (DSL) lines carrying voice data, is based on measurements of line performance parameters such as signal noise margin and relative capacity. These line performance parameters do not directly measure the actual voice quality provided by a broadband connection. Line performance adjustments can also be made utilizing a manual process that depends on a particular technician's preferences, experience, and judgment. This manual process often leads to inaccurate performance adjustments and is typically error-prone.

Even after a broadband line has been adjusted, the actual voice quality of the line may be better, the same, or may be worse since the customer experience and voice quality are subjective and cannot be directly measured or calculated during the typical adjustment process. Voice applications are real-time applications, and real-time applications are much more sensitive to delay than traditional applications. With the increasing demand for real-time applications such as voice communication and network gaming, the demand for line optimization becomes more important. Accordingly, there is a need for an improved method and system of adjusting broadband line performance.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

A system and method for improving the transmission quality of a broadband link by selecting alternate profiles is provided herein. The broadband link can be implemented by a fiber solution like fiber to the home or fiber to the neighborhood, a cable solution, and/or a digital subscriber loop (DSL) line offering such as an asynchronous digital subscriber loop (ADSL) line or some other DSL line. DSL line offerings are collectively referred to herein as xDSL line offerings. The following discussions focus on VoIP services in xDSL implementations, but the teachings should not be limited to the specific embodiments discussed herein. The teachings may have broader application than the specifically referenced services and transports.

A user of a voice over Internet protocol (VoIP) phone may receive a level of service that is determined by the amount of code violations, line delay and line speed of the line connecting the user. When the condition of an xDSL line degrades due to a lowered signal noise margin (SNM), increased impulse noise, increased interference, or other adverse conditions, the line may experience dramatic increases of code violations. Voice quality over the broadband line can degrade rapidly when there is an increase in code violations.

Voice applications can be transmitted, for example, over xDSL lines utilizing a user datagram protocol (UDP). If a code violation or line error hits a voice UDP packet and causes a cyclic redundancy check (CRC) error, the UDP packet is often dropped or lost. Lost data leads to lower quality of service and can significantly degrade the quality of voice transmitted over broadband links like xDSL lines. Unlike transmission control protocol (TCP) over Internet protocol (TCP/IP), UDP/IP provides very few error recovery services. Instead UDP/IP provides a direct way to send and receive "datagrams" or data packets over an IP based network. The errors occurring on a line carrying UDP over Internet protocol (UDP/IP) that cannot be corrected by the error correction of a coding algorithm, do not result in packet re-transmission as with other protocols but in packet loss.

In an xDSL implementation, if an xDSL line experiences a high degree of code violations, it might need to be moved to a lower speed profile that is more resistant to interference, or moved to an interleaved channel profile (if it is currently running at a fast channel profile) where the interleaving provides superior error correction ability. The line's code violation count can often be greatly reduced with an appropriate new line profile. But, a lower speed profile or interleaved channel profile can result in inadequate data throughput. In the case of interleaved channel profiles, lowered data rates are the result of delays that comes from frame scrambling, buffering, and error detection/correction.

The system and a method disclosed herein includes setting a threshold for voice quality and determining a number of acceptable code violations that can occur without compromising the voice quality of the broadband link. When the actual number of code violations exceeds the determined number of code violations, an alternate profile is selected for the broadband line. The present disclosure provides a system and method that can be utilized to determine when a line should be moved to a different profile in order to maintain or increase the voice quality supported by the line. A performance tradeoff can be made between a current profile with a high line speed having a high number of code violations and a lower data rate profile having a lower number of code violations. Therefore, whether or not a troubled line needs a new profile and which new profile should be selected, may depend on the availability of a profile that can achieve a high enough UDP/IP throughput (high enough data rate) with low enough code violations. The disclosed system and method is useful for improving time sensitive transmission over a broadband connection.

In one configuration, the performance adjustment system and method can measure the frequency of code violations and select a new line profile based on the measurement. In accordance with the teachings herein, the frequency of code violations occurring on a broadband line can be correlated to an acceptable voice quality, thus, a line profile maintaining lower code violation counts can provide improved voice quality. In other configurations line parameters such as line speed and end-to-end-transmission delay are measured and considered in selecting a profile.

Figure 1:
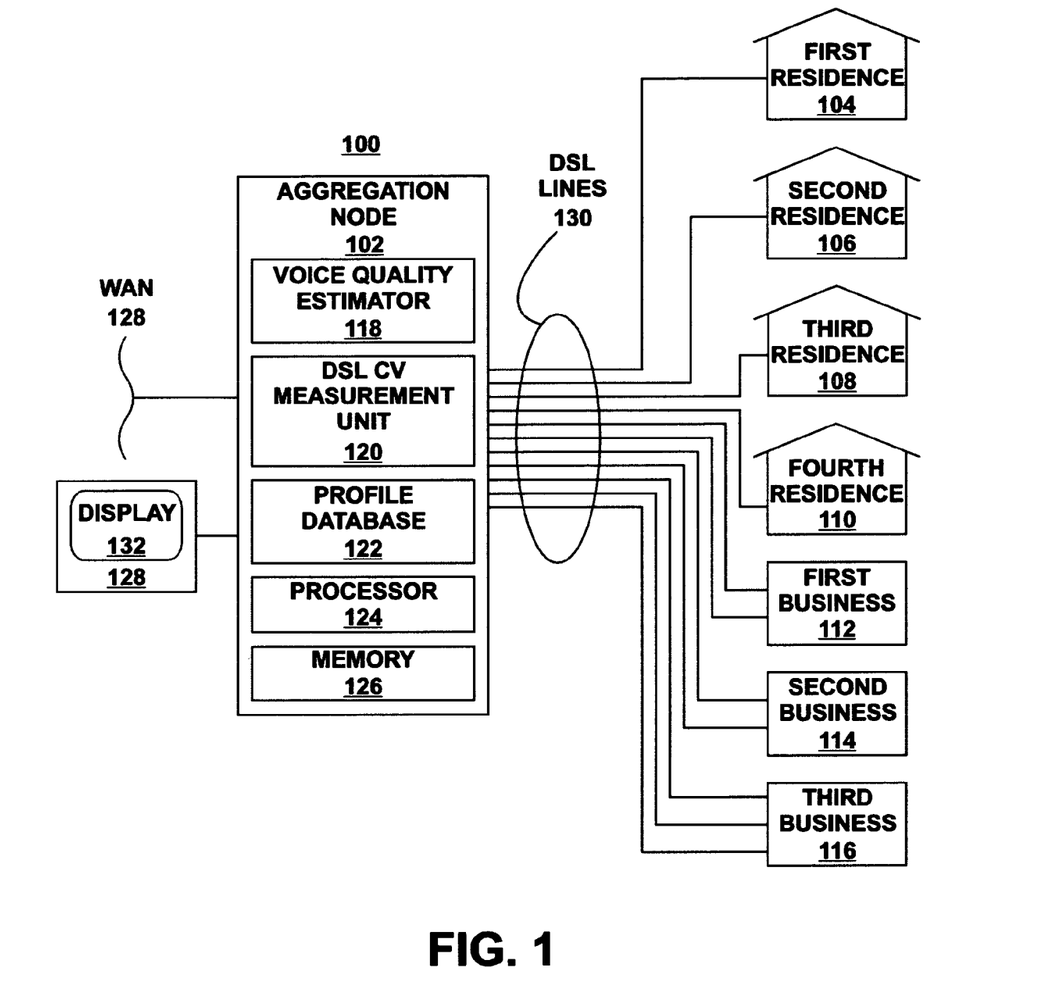
FIG. 1 is a block diagram that illustrates a broadband line profile control system.

Referring to FIG. 1, an xDSL system that may be used to select profiles and adjust broadband line performance is shown. Depending upon implementation detail, the system may be located at an aggregation node 102 of a telephone service provider or at any location having access to xDSL lines 130 such as a central office. Aggregation node 102 can be coupled to wide area network (WAN) 128. In one configuration, the system includes a processor 124, memory 126, an xDSL code violation measurement unit 120, a transmission line profile database 122, and a voice quality estimator 118.

The aggregation node 102 can also consist of, or be coupled to, either directly or remotely, a terminal device 128 having a display 132. In an illustrative embodiment the xDSL code violation measurement unit 120 is responsive to, and takes measurements of code violations occurring on xDSL lines 130, wherein the voice quality estimator 118 can "subjectively" and/or objectively measure the voice quality of a line.

During operation, xDSL lines 130 can carry data such as voice data to and from residences such as first residence 104, second residence 106, third residences 108, and fourth residence 110; and to and from businesses such as first business 112, second business 114 and third business 116. Although only a few xDSL lines 130 and subscriber types are illustrated, the system and method taught herein could be utilized to service thousands of DSL, ADSL or xDSL lines and all different types of subscribers or customers. In one embodiment the processor 124 can be coupled to the transmission line profile database 122, the voice quality estimator 118 and the xDSL line measurement unit 120. Depending upon implementation detail, the memory 126 can include a software routine that, when executed causes the processor 124 to communicate with the xDSL code violation measurement unit 120 or the voice quality estimator 118 and identify xDSL lines 130 that have higher levels of code violations or other substandard parameters.

In an illustrative embodiment, the processor 124 helps to facilitate reports, including graphical displays and charts, on a display 132 of a terminal device 128. In a particular embodiment, the terminal device 128 is a remote device that includes a web browser interface and is coupled to the processor 124 via a distributed data network such as wide area network (WAN) 128 (not shown).

Based at least partially on the measured parameters, processor 124 may select an improved transmission line profile from the transmission line database 122 and apply the newly selected profile to an underperforming xDSL line. The frequency of code violations on a specific line, may, for example, be correlated to voice quality, and in one configuration an acceptable number of code violations for a selected time period may be determined. For example, the number of code violations over a time period such as a one, five, ten, or fifteen-minute time period may be utilized to determine if an xDSL line is underperforming. The frequency of acceptable code violations will typically vary depending on the configuration of the line such as the hardware and the protocol utilized to implement the line.

Selecting a code violation threshold that provides acceptable voice quality can be a subjective process. Depending upon implementation detail, a voice quality threshold can be set based on many standards. One such standard is a perceptual speech quality measurement (PSQM) score and another is a mean opinion score (MOS). In one embodiment, a code violation threshold is set based on the voice quality threshold and a line configuration. Different line configurations may include different types of voice coders/decoders (CODECs), different line lengths and may utilize different communication standards.

For example, a line complying with a G.726 specification, (a standard promulgated by the Telecommunications Standardization Sector of the International Telecommunications Union (ITU)) may be able to sustain many more code violations and yet be able to provide better voice quality than a line complying with the G.711 standard. Accordingly, the code violation threshold may be at least partially dependent on the voice quality threshold and the configuration of the line. In operation, when the frequency of code violations exceeds the code violation threshold or the voice quality is suspect, the profile of the xDSL line may be changed to another profile. In practice, processor 124 may produce a "reconfigure signal" indicating that the line is underperforming and the profile of the line is to be changed to a different/improved profile.

The different profiles may help balance different line speeds and error rates by implementing a fast channel, an interleave profile, a specific depth of interleave profile and different line speeds or any other suitable format. A fast channel can provide superior speed, but is often susceptible to outside interference and has limited error detection and correction. An interleaved profile can provide superior error correction but also has inherent delays due to the required buffering of data. Interleaved profiles have different depths, wherein lower depths introduce less delay but compromise the error correction ability. Line speeds can also be adjusted, which may help to reduce outside interference. A profile may be chosen based on whether it is a slow data rate that does not provide enough data or the fast communication speed that is causing too many code violations. After a profile is selected to minimize code violations and maximize communication speed, a line profile may be altered—hopefully resulting in an improved quality of the voice over the broadband line.

Figure 2:
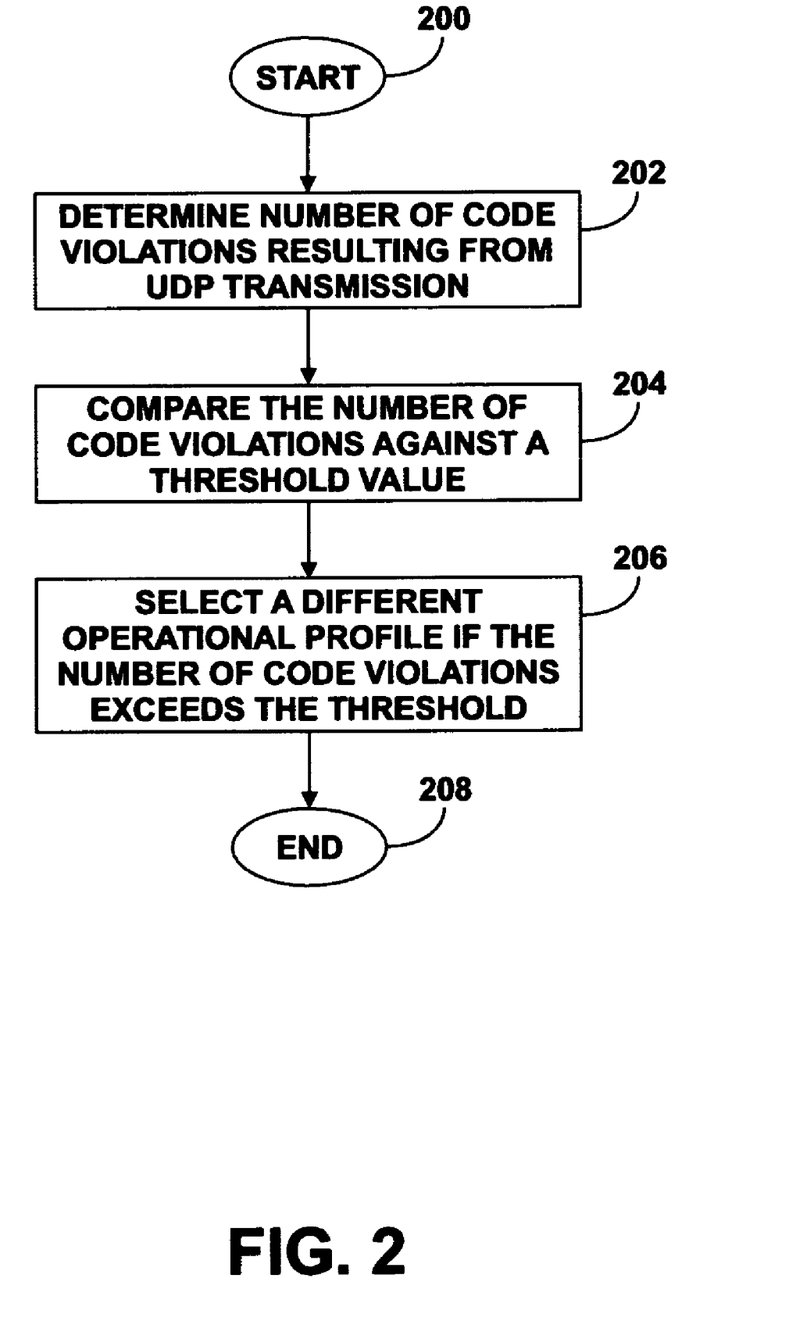
FIG. 2 is a flow chart that illustrates a method of selecting a profile of a broadband communication line.

Referring to FIG. 2, an illustrative method of selecting a profile to be applied to a broadband communication line is shown. The process starts at step 200 and proceeds to step 202 where a broadband line that utilizes a transmission profile is monitored and the number of code violations resulting from broadband transmissions such as UDP/IP transmissions is determined. The number of code violations is compared to a threshold value at step 204 and a different operational profile is selected when the number of code violations exceeds the threshold value at step 206. The process ends at step 208.

Depending upon implementation detail, the initial transmission profile can be a fast channel that has the bandwidth to provide superior voice quality unless interference is present on the line, wherein a slower channel with error correction can be selected to provide superior voice quality.

In practice, information may be developed and maintained that correlates a number of code violations during a given period of time to a perceived voice quality. In some implementations, the threshold value may correspond to toll quality. For example, a typical Plain Old Telephony Service (POTS) quality may be set as the quality floor.

Figure 3:
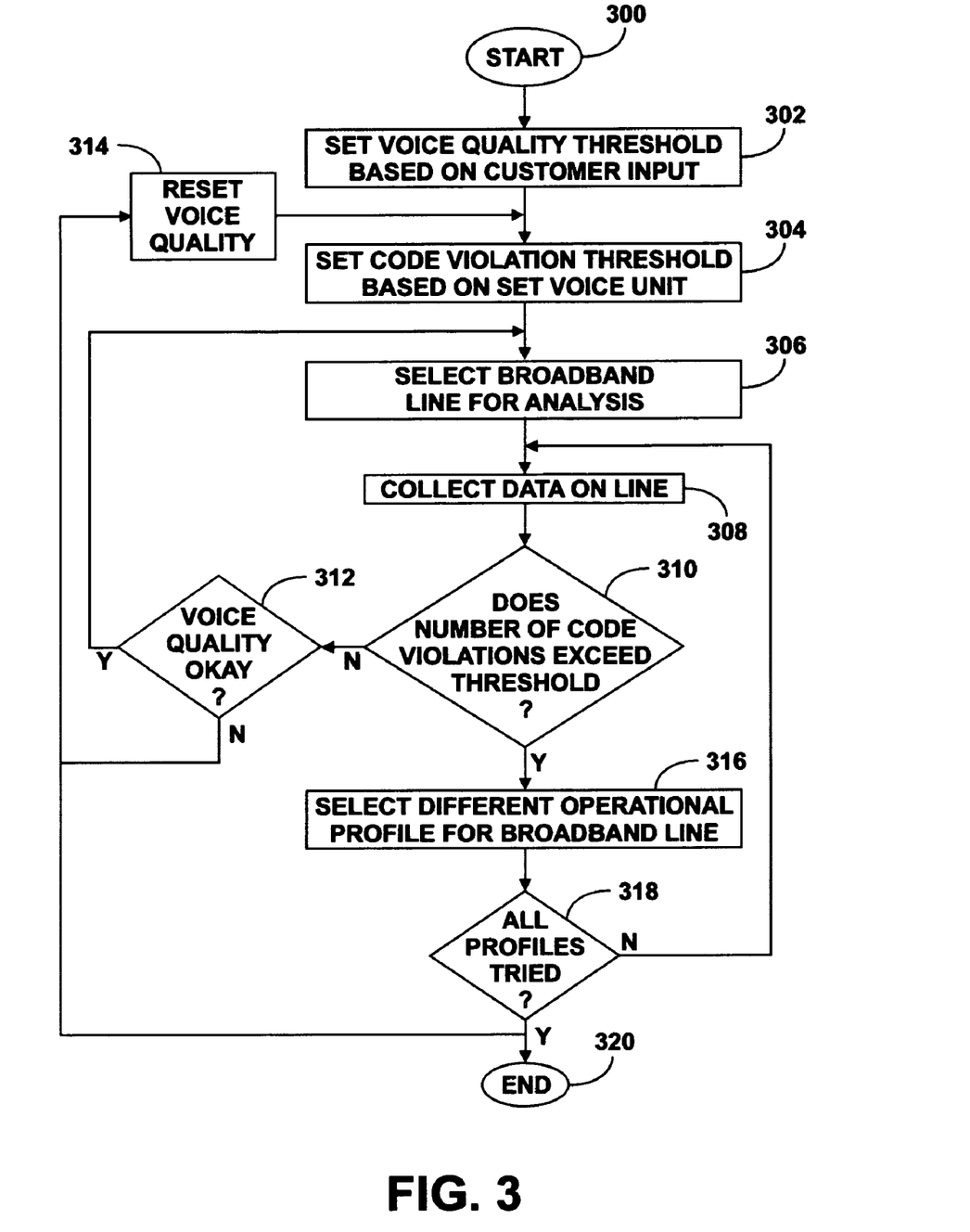
FIG. 3 is a flow chart that illustrates another method of selecting a profile of a broadband communication line.

Referring to FIG. 3, an illustrative method of automatically providing acceptable quality of service to a subscriber by selecting and adjusting threshold values and selecting transmission line profiles is illustrated. The process starts at step 300 and proceeds to step 302 where a voice quality threshold is set. Voice quality is typically a subjective measurement and can be determined in many ways such as by an industry standard, user feedback or a perceived user preference. For example, a mean opinion score (MOS) can provide a numerical measure of the quality of human speech at the destination end of a telephone circuit. This score can be calculated by taking a mathematical average of opinionated scores (a poll) to obtain a quantitative indicator of voice quality. Other systems can provide an objective measurement such as perceptual speech quality measurement (PSQM) that objectively assesses the quality of speech as degraded by a telephony network. PSQM is further defined in the International Telecommunications Union standard ITU-T P.861.

In one configuration, a MOS score of between 3 and 6 and/or a PSQM of between 2 and 3 may be used when setting a threshold that provides acceptable voice quality. In accordance with the present teaching, it may be determined that there is a correlation between the frequency of code violations occurring in UDP transmission and the voice quality provided by the UDP transmission. Thus, code violation rates of 1,080/minute could relate to, or be correlated with, a PSQM score of 2.25. In this case, and in accordance with appropriate lab test results, when the code violations on a specific line remain below the correlated value, the voice quality can be maintained at an acceptable level. To further understand a possible correlation between voice quality and code violations reference may be made to FIG. 4, which will be described in more detail below.

Referring back to FIG. 3, a code violation threshold can be selected at step 304 based the communication standard utilized on the line and the voice quality threshold as determined at step 302. A broadband line such as an ASDL line is selected for evaluation at step 306 and data is collected from the ADSL line including the frequency of code violations occurring on the selected line at step 308. It can be determined if the number of code violations exceeds the code violation threshold at decision step 310.

In one embodiment, when the number of code violation is less than the threshold value the process proceeds to determine if the voice quality is acceptable at decision step 312 and when the voice quality is acceptable the method proceeds to select another xDSL line for analysis. When the voice quality is unacceptable, possibly determined by prompting a user or measuring voice quality, then the voice quality threshold is reset at step 314 and a new code violation threshold will be set at step 304 as the process reiterates.

When, at step 310 the number of code violations for the selected broadband line exceeds the threshold number it is likely that the voice quality on the selected line is being compromised and a different profile can be selected and applied at step 316. The profile selection process can be a "smart" process that learns from the resulting improvement and/or degradation associated with past selections. This "experience" data may help in making a better choice when selecting a specific profile to improve specific parameters and enhance the performance of an underperforming line. The profile(s) that have been implemented may be logged at decision step 318 and the process may revert to step 308 where data is collected on the newly implemented profile. When all profiles have been tried, the process proceeds to step 314 to reset the voice quality parameter, otherwise the process can end at step 320.

As illustrated, the method may optionally be repeated for a plurality of different broadband lines such as ADSL lines. In a sample network, there may a vast number of DSL lines, and a selected profile may be determined for each of the DSL lines. The above-described method may be automatically performed using a computer system to determine a selected profile that provides the highest UDP/IP performance and preferably a high quality voice connection.

Figure 4:
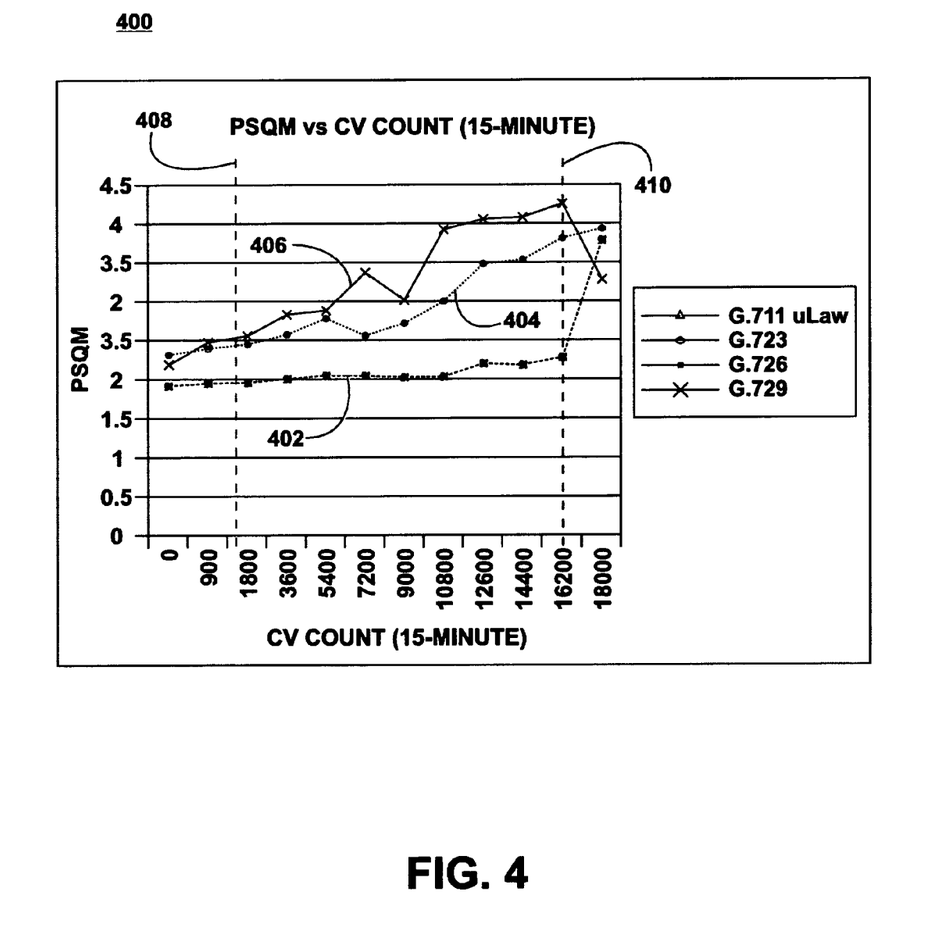
FIG. 4 is a general diagram that illustrates a graphical display that may be provided to a profiler of a system in connection with broadband line profile selection.

Referring to FIG. 4, a graphical interface is shown that may be provided on a display. Each depicted curve may have been formed from measuring code violations from a plurality of UDP/IP hardware/software configurations on particular xDSL lines. As shown, the sample graph 400 illustrates a correlation between different voice CODECS utilizing different communication standards, code violations and voice quality. The PSQM value indicating voice quality appears on the vertical axis and the code violations per a 15-minute time period appear on the horizontal axis. The curves 404, 402, and 406 indicate a code violation/voice quality correlation for a G.723 format, a G.726 format and a G.729 format respectively.

The curves 402, 406 and 406 illustrate when the frequency of code violation increase, the voice quality decreases. A voice quality threshold can be set at a PSQM of 2.2 and correspondingly when a G.726 standard is utilized, the code violation threshold can be set at 1350/15 minutes as illustrated by line 408 to maintain a PSQM voice quality of 2.4. Likewise, for a G.729 line standard the code violation threshold can be set at 16400 as illustrated by line 410.

Unlike traditional ADSL optimization, which is based solely on line performance parameters such as signal to noise margin and relative capacity, the system and method presented herein may be based on several factors like UDP/IP transmission speed, code violations and other level one protocol parameters. Specific implementations of the methods and systems presented may be based on experimental results of lab testing.

In practice, utilizing the teachings herein may help providers to keep the voice PSQM score above acceptable levels when the code violations do not exceed the predetermined threshold. For example, if an xDSL line utilizing a fast channel profile consistently experiences code violation levels that exceed the predetermined code violation threshold, the xDSL line can be switched to a different profile such as an interleaved profile or to a lower speed profile in order to improve the voice quality. The hardware/software standards and configurations supporting the line can require different thresholds and correlations to be set for the xDSL line. In this manner, an automated system and method has been described to provide for increased UDP/IP packet transfer performance over an entire network of xDSL lines.

In practice, an automated system may be used with the system of FIG. 1 where processor 124 repeatedly executes a profile selection routine, retrieves profiles from the profile database 122 and performs the operational steps and computations illustrated in FIGS. 2 and/or 3. The method and system may make use and generate clear criteria to determine when a line should be switched to another profile, and provides better UDP/IP voice performance and therefore, a better user experience. Broadband line users can also be prompted by the system to determine if voice quality is acceptable or if it has been improved after switching to another profile.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

In a particular embodiment, the digital subscriber line control system comprises a computer readable medium tangibly embodying a program of instructions to manipulate a processor to: determine a number of code violations resulting from voice UDP packet transmissions communicated via a broadband link during a first period of time; compare the number of code violations against a threshold value; and select a different operational profile for the broadband link if the number of code violations exceeds the threshold value.

What is claimed is:

1. A method comprising:
determining, at an aggregation node, a number of code violations resulting from transmissions communicated via a broadband link during a first period of time in accordance with a first interleaved profile associated with a first transmission delay;
comparing, at the aggregation node, the number of code violations against a code violation threshold value;
selecting a different profile for the broadband link responsive to the number of code violations exceeding the code violation threshold value, wherein the different profile is a second interleaved profile associated with a second transmission delay that is greater than the first transmission delay;
after selecting the different profile, prompting a user of the broadband link as to whether a voice quality on the broadband link improved; and
modifying the code violation threshold value when the user indicates that the voice quality on the broadband link did not improve after selecting the different profile.

2. The method of claim 1, further comprising repeating, at the aggregation node, the determining and the comparing a plurality of times prior to selecting a second interleaved profile for the broadband link.

3. The method of claim 1, wherein the code violation threshold value is further selected based on a voice quality threshold value and a communication standard of the broadband link.

4. The method of claim 3, wherein the code violation threshold value is determined based on a link configuration of the broadband link.

5. The method of claim 1, wherein the selection of the different profile is at least partially based on stored profile data related to the performance of a plurality of available profiles from which the different profile is selected.

6. The method of claim 1, wherein the code violation threshold value is further selected based on a mean opinion score, wherein the mean opinion score is determined at least in part by a poll to obtain a quantitative indicator of voice quality.

7. A method comprising:
selecting, at an aggregation node, a code violation threshold value corresponding to an acceptable voice quality, wherein the acceptable voice quality is associated with a perceptional speech quality measurement that is greater than 2 and less than 3;
determining, at the aggregation node, a number of code violations resulting from voice over internet protocol user datagram protocol packet transmissions communicated via a broadband link during a first period of time, wherein the voice over internet protocol user datagram protocol packet transmissions utilize a non-interleaved profile;
comparing, at the aggregation node, the number of code violations against the code violation threshold value;
selecting, at the aggregation node, an interleaved profile for the broadband link when the number of code violations exceeds the code violation threshold value; and
altering, at the aggregation node, an interleaving depth and a transmission delay responsive to the code violation threshold value.

8. The method of claim 7, wherein the perceptional speech quality measurement associated with the acceptable voice quality is equal to 2.25.

9. A system comprising:
at least one digital subscriber line configurable between a first profile and a second profile;
a code violation detector coupled to the at least one digital subscriber line and configured to track code violations occurring on the at least one digital subscriber line;
a voice quality estimator coupled to the at least one digital subscriber line and configured to:
select a code violation threshold value corresponding to an acceptable voice quality, wherein the acceptable voice quality is associated with a perceptional speech quality measurement that is greater than 2 and less than 3; and
estimate a voice quality of the at least one digital subscriber line by comparing the tracked code violations to the code violation threshold; and
a digital subscriber line profiler responsive to the code violation detector and operable to output a reconfigured signal indicating that the at least one digital subscriber line is to be reconfigured from the first profile to the second profile, wherein the first profile is a first interleaved profile associated with a first transmission delay and the second profile is a second interleaved profile associated with a second transmission delay that is greater than the first transmission delay.

10. The system of claim 9, wherein the first profile has a greater line speed than the second profile.

11. The system of claim 9, wherein a voice quality on the digital subscriber line and a bandwidth usage on the digital subscriber line are modified by changing to the second profile.

12. A method comprising:
selecting, at an aggregation node, a broadband line having a first profile from a plurality of broadband lines;
determining, at the aggregation node, an acceptable voice quality value for the selected broadband line;
relating a code violation threshold value to the determined acceptable voice quality value;
monitoring code violations as an indicator of voice quality provided to a subscriber;
implementing, at the aggregation node, a second profile when the selected broadband line incurs code violations in excess of the code violation threshold value, wherein the first profile is a first interleaved profile associated with a first transmission delay and the second profile is a second interleaved profile associated with a second transmission delay that is greater than the first transmission delay
after implementing the second profile, prompting a user of the broadband line to determine whether the implementation of the second profile improved a voice quality on the broadband line; and
modifying the code threshold value when the user indicates that the implementation of the second profile did not improve the voice quality on the broadband line.

13. The method of claim 12, wherein at least one of the first profile and the second profile is selected based at least in part on code violations and delay.

14. A digital subscriber line control system comprising:
a controller including memory and a processor;
a code violation measurement unit responsive to digital subscriber lines, the code violation measurement unit to provide code violation data associated with each of the digital subscriber lines;
a profile database to store a plurality of profiles including a first profile and a second profile;

a terminal device responsive to the controller, the terminal device configured to display a graphical report, the graphical report including a first profile curve illustrating voice quality with respect to code violation data for the first profile and a second profile curve illustrating voice quality with respect to code violation data for the second profile; and a computer readable medium storing processor executable instructions that, when executed by the processor, cause the processor to:

select a code violation threshold value corresponding to an acceptable voice quality, wherein the acceptable voice quality has a perceptional speech quality measurement that is greater than 2 and less than 3;

determine a number of code violations resulting from transmissions communicated via a particular digital subscriber line during a first period of time in accordance with a first interleaved profile associated with a first transmission delay;

compare the number of code violations against the code violation threshold value; and select a different profile for the particular digital subscriber line if the number of code violations exceeds the code violation threshold value, wherein the different profile is a second interleaved profile associated with a second transmission delay that is greater than the first transmission delay.

15. The digital subscriber line control system of claim 14, wherein the controller includes a profile selection routine, wherein the profile selection routine automatically initiates collection of code violation data and comparison of the voice quality for selection of a profile for application to each of the digital subscriber lines.

* * * * *